(12) United States Patent
Rodman (10) Patent No.: US 7,170,545 B2
(45) Date of Patent: Jan. 30, 2007

(54) METHOD AND APPARATUS FOR INSERTING VARIABLE AUDIO DELAY TO MINIMIZE LATENCY IN VIDEO CONFERENCING

(75) Inventor: Jeffrey C. Rodman, San Francisco, CA (US)

(73) Assignee: Polycom, Inc., Pleasanton, CA (US)

( * ) Notice: Subject to any disclaimer, the term of this patent is extended or adjusted under 35 U.S.C. 154(b) by 294 days.

(21) Appl. No.: 10/832,547

(22) Filed: Apr. 27, 2004

(65) Prior Publication Data

US 2005/0237378 A1 Oct. 27, 2005

(51) Int. Cl.
*H04N 7/14* (2006.01)

(52) U.S. Cl. .............................. 348/14.12; 348/14.08; 348/14.11

(58) Field of Classification Search .. 348/14.01–14.09, 348/14.1, 14.11–14.13, 512, 518, 515, 423.1; 709/231; 704/270, 258
See application file for complete search history.

(56) References Cited

U.S. PATENT DOCUMENTS

| | | | |
|---|---|---|---|
| 4,313,135 A | 1/1982 | Cooper | |
| 4,703,355 A | 10/1987 | Cooper | |
| 5,202,761 A | 4/1993 | Cooper | |
| 5,387,943 A | 2/1995 | Silver | |
| 5,430,485 A | 7/1995 | Lankford et al. | |
| 5,623,490 A * | 4/1997 | Richter et al. | 370/263 |
| 5,642,171 A | 6/1997 | Baumgartner et al. | |
| 5,821,987 A | 10/1998 | Larson | |
| 5,874,997 A | 2/1999 | Haigh | |
| 5,875,354 A | 2/1999 | Charlton et al. | |
| 5,915,091 A | 6/1999 | Ludwig et al. | |
| 5,930,451 A | 7/1999 | Ejiri | |
| 5,953,049 A * | 9/1999 | Horn et al. | 348/14.09 |
| 6,122,668 A | 9/2000 | Teng et al. | |
| 6,181,383 B1 | 1/2001 | Fox et al. | |
| 6,191,821 B1 | 2/2001 | Kupnicki | |
| 6,201,562 B1 | 3/2001 | Lor | |
| 6,262,776 B1 | 7/2001 | Griffits | |
| 6,269,122 B1 | 7/2001 | Prasad et al. | |
| 6,275,537 B1 | 8/2001 | Lee | |
| 6,285,405 B1 | 9/2001 | Binford, Jr. et al. | |
| 6,313,879 B1 | 11/2001 | Kubo et al. | |
| 6,330,033 B1 | 12/2001 | Cooper | |
| 6,337,883 B1 | 1/2002 | Tanaka | |
| 6,339,760 B1 | 1/2002 | Koda et al. | |
| 6,356,312 B1 | 3/2002 | Lyu | |
| 6,359,656 B1 | 3/2002 | Huckins | |
| 6,360,202 B1 | 3/2002 | Bhadkamkar et al. | |
| 2001/0037499 A1 | 11/2001 | Turock et al. | |
| 2001/0056474 A1 | 12/2001 | Arai | |
| 2002/0008778 A1 | 1/2002 | Grigorian | |

\* cited by examiner

*Primary Examiner*—Melur Ramakrishnaiah
(74) *Attorney, Agent, or Firm*—Wong Cabello Lutsch Rutherford & Brucculeri, LLP (57) ABSTRACT

A method and apparatus to insert variable audio delay during video conferencing to achieve conflicting goals of lip-sync and interactive conversation. The amount of audio delay is variable according to the condition of the videoconferencing: long audio delay is inserted to achieve lip-sync between audio and video playback during monologue speech, but minimum or no audio delay is inserted during interactive discussion or argument. Variable audio playback speeds may be used instead of inserting quantum delay to achieve the same result. Various methods and apparatuses to detect the non-interactive mode or interactive modes are also disclosed.

60 Claims, 6 Drawing Sheets

METHOD AND APPARATUS FOR INSERTING VARIABLE AUDIO DELAY TO MINIMIZE LATENCY IN VIDEO CONFERENCING

RELATED APPLICATIONS

None.

BACKGROUND OF THE INVENTION

1. Field of the Invention

This invention relates to video conferencing, in particular relates to audio video synchronization in video conferencing and audio latency reduction.

2. Description of the Related Art

In videoconferencing, video and audio signals from one site are digitally compressed and then sent over conventional communication channels (such as ISDN, IP, etc.) to either a bridge, which will then send the signal on to multiple sites, or to a second site directly. It is a fact of current technology that video is often delayed by significant amounts, from 50 milliseconds to over 2 seconds, in order to perform the necessary processing, which can be quite complex. This video delay may be referred to as video delay. Common practice is to delay the audio to match this video latency in order to maintain synchronization, also called lip-sync. But it is important to note that audio does not have the same inherent delay as video, in part because the algorithms are designed to minimize delay, so this delay is only inserted to synchronize the audio with the video. The inherent delay in audio processing is usually much less. This inherent delay in audio processing is herein referred to as minimum delay.

A problem arises when a video connection exists as part of a two-way (or multi-way) conversation rather than a one-way connection such as a television broadcast or a college lecture. In such cases, one important element is the natural back-and-forth conversational flow. Studies have shown that as little as 200 ms of added round-trip delay can severely degrade the feeling of "being there" that both ends must experience in order to have a normal conversation. Clearly, when 500 to 200 ms are added to synchronize the audio to the slower video, much of the efficiency of the conversation is lost. People will talk over each other, then stop, then talk over each other again. They may deliberately wait, knowing that this delay exists, and so produce a perception of arrogance where none actually exists.

With multimedia bridging now being more common in business conferencing, the need to address audio latency is becoming even more urgent, because these delays are often doubled when going through such a bridge.

There are thus two conflicting requirements in videoconferencing: minimal audio delay, and video-audio synchronization (lip-sync). The traditional approach is to insert additional audio delay in order to achieve lip-sync. As discussed above, these long audio delays cause the resultant conversations to be difficult and stilted. Particularly when talkers are interacting, such as in argument or spirited discussion, low audio latency becomes more important than lip-sync. It is desirable to have a method or system that can reconcile these two conflicting goals in a videoconferencing or make the conflict less discernable.

SUMMARY OF THE INVENTION

The present invention discloses some methods and systems that can minimize the conflict between the two conflicting goals of video conferencing. In one embodiment, a variable audio delay is inserted into the audio stream according to the different situations during a video conferencing: a longer delay is inserted during a monologue, where only one participant is speaking; a short delay or no delay is inserted during an interactive discussion or spirited argument.

In another embodiment, the replay speed of the audio is varied between slower than normal speed to introduce delay or faster than normal speed to reduce delay. A digital speed adjustment is employed such that the audio pitch is not affected by the varied replay speed.

BRIEF DESCRIPTION OF THE DRAWINGS

A better understanding of the invention can be obtained when the following detailed description of the preferred embodiment is considered in conjunction with the following drawings, in which.

DESCRIPTION OF THE PREFERRED EMBODIMENT

To reconcile the conflicting goals in a videoconferencing, a method of this invention is to vary the delay of the audio channel as a function of the degree of interaction or spiritedness that is occurring, instead of keeping the audio delay constant. In other words, when people are talking back and forth rapidly, such as when arguing or interrupting each other, audio delay is cut to a minimum by this embodiment. When one person is talking for a longer time, such as when describing a painting, delivering a lecture, or reading a story, the delay is allowed to increase sufficiently to synchronize audio to the video.

It is found that when the conversation is going back and forth very rapidly, both sides are paying more attention to the speech and less to the video, and so do not notice the lack of synchronization as much. When the interaction slows down, they notice synchronization more, and that is where this embodiment allows synchronization to be restored. Common standard techniques for video conferencing such as H.320 and H.323 operate with separate channels for audio and video. They are compatible with this method of the current invention.

Figure 2:
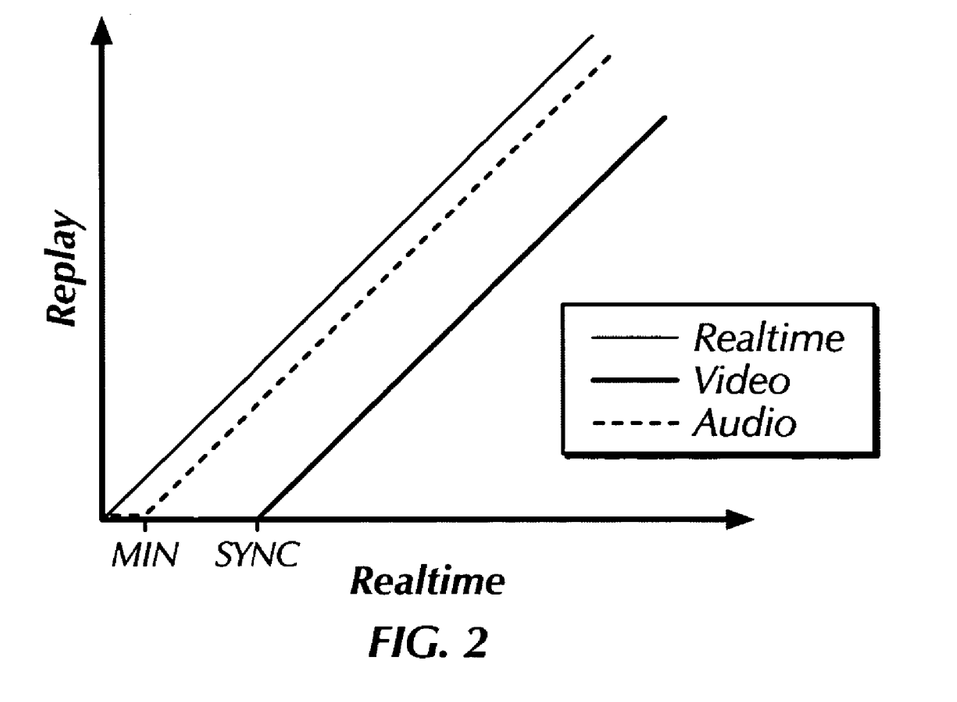
FIG. 2 illustrates the video and audio signal replay related to playing time where no artificial delay is inserted to audio replay.

In this method, the inserted delay in the audio channel is increased and decreased as a function of the interaction. One way to achieve this is to determine what delay is the minimum possible (DelayMin) and the delay necessary to synchronize audio with the video (DelaySync). When the speech is interactive, the inserted delay is switched to DelayMin. FIG. 2 shows a relationship between audio and video signals when there is minimum audio delay. In this diagram, real time is shown on the horizontal axis, and replay time, i.e. the time at which a signal (audio or video) exits the system, is shown on the vertical axis. A horizontal distance between two points at a same height is the time delay between the two points in replay. When the signal exits the system at the same speed with which it entered (which was in real time), the two values are equal and the result is a straight line angled at 45 degrees. A line drawn at a 45-degree angle means that the replay speed is at a normal speed, i.e. the same speed as the signal is generated in real time. A line drawn at an angle less than 45 degrees means that the replay speed is slower than the normal speed, i.e. the speed the signal is generated in real time. The delay (i.e. horizontal distance between this line and a 45-degree line) will increase as time pass by. A line drawn at an angle greater than 45 degrees means that the replay speed is faster than the normal speed. Because a signal cannot be replayed before it is generated, a faster replay can only take place when there is an initial delay. When there is an initial delay, the signal is received and buffered somewhere, the replay may be speeded-up and the total time to replay a segment of the signal is less than the total time to generate or receive such segment. A 45-degree line having its lower end at the origin represents a signal with zero delay (replay time and real time are equal) being played at normal speed. A line drawn at a 45 degree angle, and having its lower end to the right of the origin, is the result of a signal that is experiencing some delay from the system (real time has gotten ahead of replay time or the replay time is behind the real time), but that is now being played at normal speed (but input and output speeds are the same, the signals are just offset). And a line drawn at less than 45 degrees (more horizontal) shows real time proceeding more quickly than replay time, which is the result of a slowed replay. A line greater than 45 degrees, or more vertical, is of course the result of a speeded-up replay.

Figure 3:
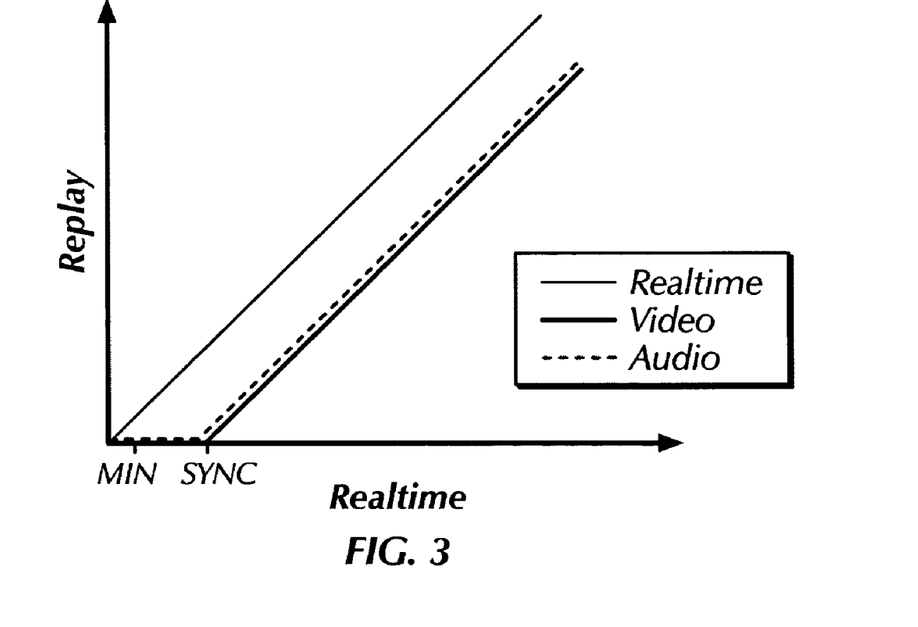
FIG. 3 illustrates the video and audio signal replay related to playing time where an artificial delay is inserted to audio replay such that video and audio replay are synchronized, i.e. lip-synced.

In FIG. 2, the audio and video replays are not in synch, i.e. video replay is about (DelaySync-DelayMin) seconds behind audio replay. When the speech is not interactive, the inserted delay is switched to DelaySync. FIG. 3 shows such a replay mode. In this mode, the additional delay is inserted into the audio replay such the total delay in audio replay is the same as the video replay. Thus the audio and video replays are synchronized.

Figure 4:
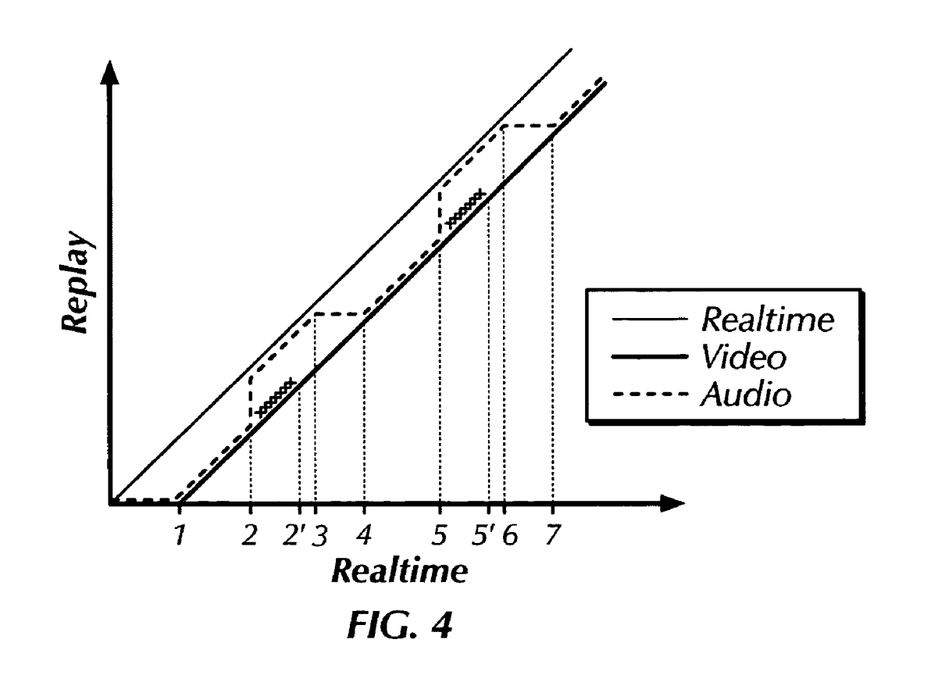
FIG. 4 illustrates the video and audio signal replay related to playing time and the switching between the interactive mode and the non-interactive mode.

This method is effective, but somewhat crude, especially during transition between the two modes, as illustrated in FIG. 4. When the audio replay is abruptly switched from DelaySync to DelayMin, as shown in FIG. 4, at time mark 2 and 5, a portion of the audio is lost, i.e. the portion that is waiting in the buffer to be replayed will not be replayed because the audio currently being received is replayed instead. In FIG. 4, the portions of the old audio between 2 and 2', 5 and 5' which are still in the buffer are lost when the new audio received at that time are received and replayed. When the audio replay is switched from DelayMin to DelaySync, audio replay is stopped for a while until the audio delay increases to the amount of DelaySync. In FIG. 4, between time marks 3–4 and 6–7, nothing is replayed while the audio replay is waiting to reach the DelaySync. This method has the advantage of requiring little processing power, and so can be suited for some applications, but switching the delay in this way will result in perceptible breaks and artifacts in the speech. In general, it may be desirable to have a better way to smoothly vary the delay inserted in the audio.

Variable Speed Channel

Figure 1:
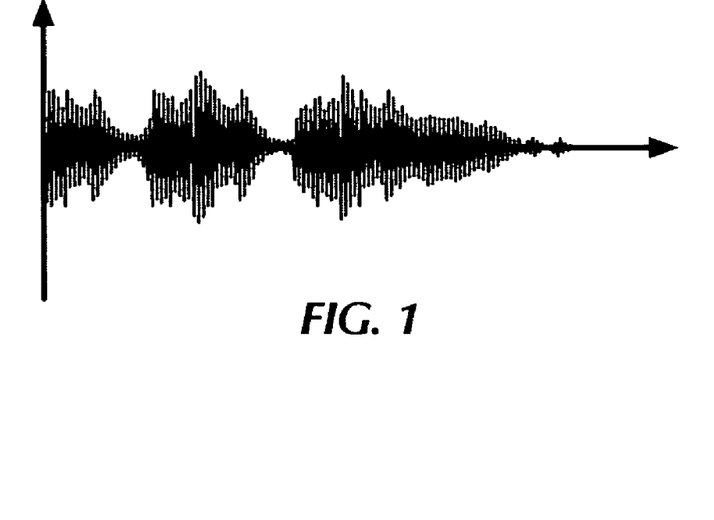
FIG. 1 illustrates an analog sound wave.

Another method in the current invention is to use a variable speed channel. FIG. 1 shows a typical analog sound wave chart, showing air pressure of sound (or electrical signals driving a loud speaker) versus time. FIG. 1 may also represent the amplitude of sound on a record versus the length of the groove on the record. Algorithms have been available for many years to "stretch" and "squeeze" audio, or slow and speed the rate at which it is played. For a record player, that just means to rotate the record at a higher speed to "squeeze" the audio or at a slower speed to "stretch" the audio. Record players have been capable of this for a century, but at the cost of affecting pitch proportionally. In other words, when a phonograph record is played at double speed, it plays in half the time but at twice the pitch (the "Alvin and the Chipmunks" sound). In the last few decades, however, digital algorithms have become available which can change the playback speed without affecting pitch. This is a very useful function, because stretching audio is a way of causing its delay to smoothly increase.

Figure 5:
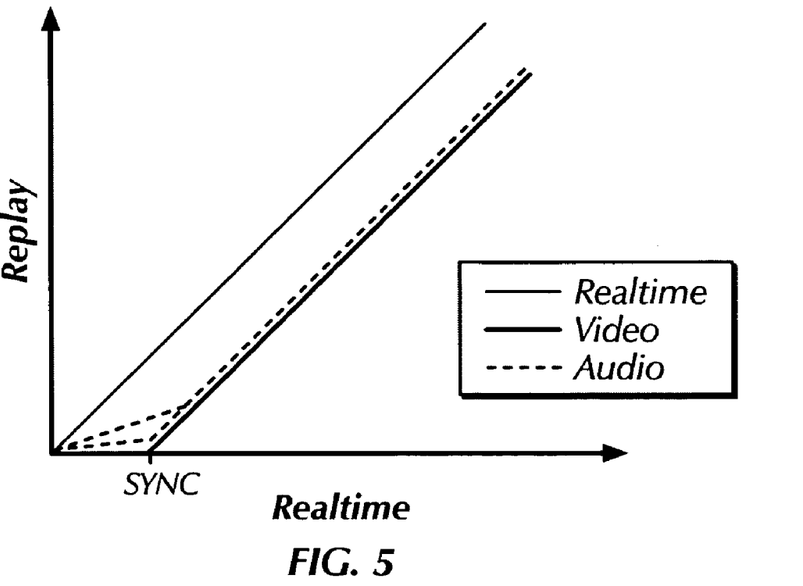
FIG. 5 illustrates the video and audio signal replay related to playing time where the audio replay is slowed down by 10% or 20% until audio and video are synchronized.

By way of illustration, let us imagine an audio system that stores ten seconds of audio and then plays it at any desired speed. For live audio signal, like the audio signal in a conference call, it takes exactly ten seconds to enter the player. If it is played at full speed, it takes exactly ten seconds to exit the player. In this case, there is no change in end-to-end delay. However, if the same audio is played 10% slower than normal, it will still take 10 seconds to receive the full 10 seconds audio, but will take 11 seconds to play a 10-second clip, resulting in a one-second added delay at the end of the time. Similarly, playing 20% slow adds a 2-second end-to-end delay. On the other hand, if there is already a delay and the ten seconds of audio has just been received, playing it 10% faster (at 110% of normal speed) will reduce delay, since audio is going out faster than it is coming in. FIG. 5 illustrates such speed changes. FIG. 5 illustrates the transition from DelayMin to DelaySync with 10% slower audio replay. Assuming the DelaySync is 2 seconds and DelayMin is 0.1 second, then it will take about 20 seconds for transition from DelayMin to DelaySync. In FIG. 5, if the replay speed is slowed by 20%, then the time for the transition is cut from 20 seconds to about 10 seconds.

Note that the delay starts at some level, then smoothly increases during the time that speech is slowed, and then remains at that higher delay level once playing speed has returned to 100%. With a variable replay speed, there is no abrupt switch between DelayMin and DelaySync, and so the problem noted with the previous embodiment, that of inserted discontinuities in the speech, does not occur.

Figure 6:
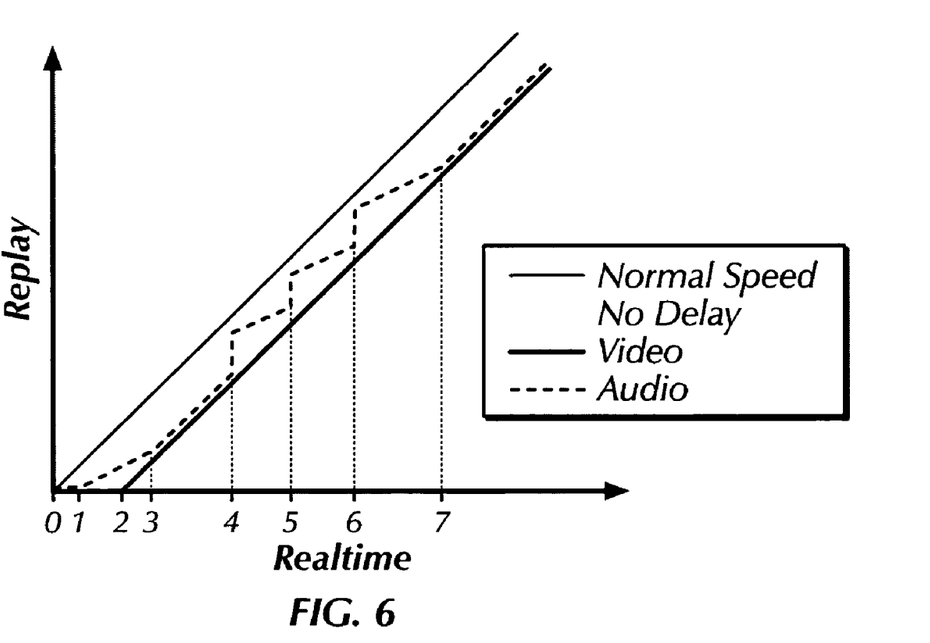
FIG. 6 illustrates the video and audio signal replay related to playing time where audio replay is switched between different modes: delayed, normal, slowed for different conferencing conditions.
Figure 10:
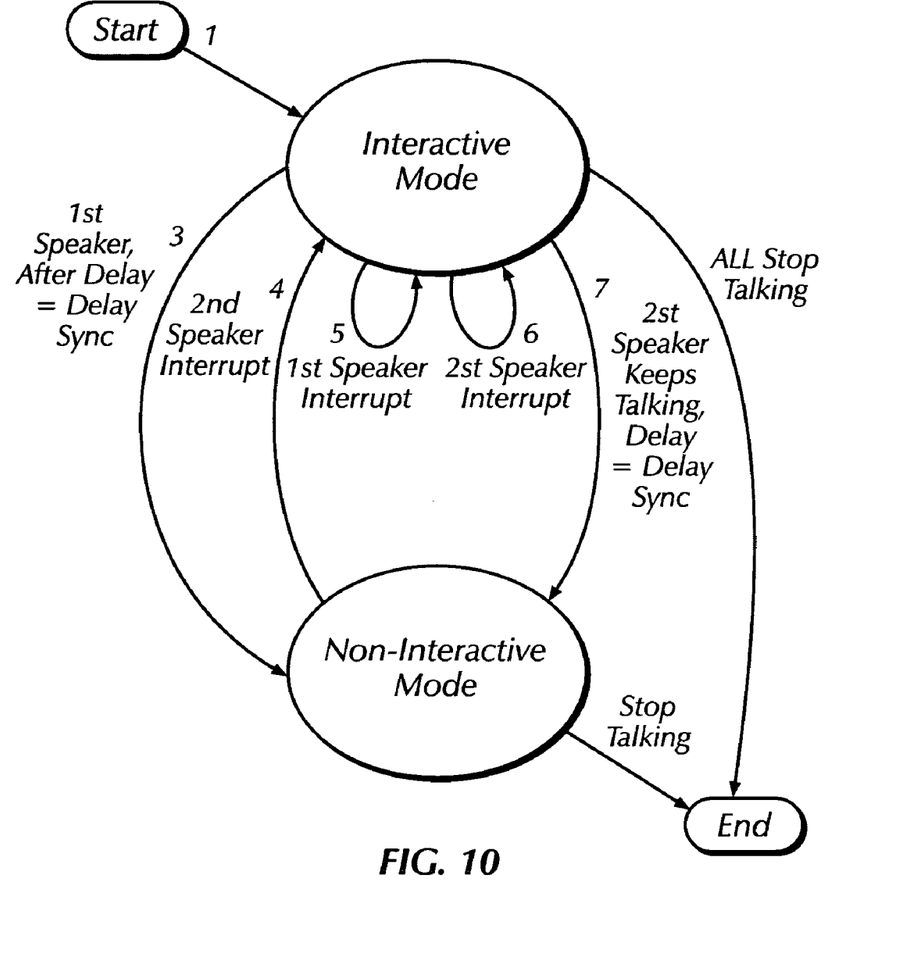
FIG. 10 is a state diagram illustrating the conferencing system operating in various modes depending on the different conferencing conditions as illustrated in FIG. 6.

FIG. 6 illustrates the audio and video replay relationship during a video conference when the audio replay mode is switched between interactive mode with minimum audio delay, monologue mode with audio-video synchronized and a transition mode in between. FIG. 10 illustrates the state changes corresponding to the embodiment as illustrated in FIG. 6. All the time marks shown in FIG. 10 are the same time marks shown in FIG. 6. In this example, for ease of discussion, assume the one-way video delay to be 2 seconds, and the audio delay to be 0.2 second.

One talker has been talking for a while. After the initial DelayMin (i.e. time mark 1), his speech is replayed at 90% of normal speed to increase the audio delay. Once the audio delay has increased to match the video delay, or two seconds, the replay speed is switched to normal at time mark 3.

A second talker now interrupts at time mark 4. Because he is an "interrupter", his audio is sent with minimal delay (in this example, 0.2 second), but slowed down by 10%. This second talker speaks for 5 second. At the end of this time, his delay has built up to 0.2+0.5 seconds, or 0.7 seconds.

The first talker now interrupts at time mark 5. His audio is also sent with 200 ms delay, and slowed down by 10% because he is also now an "interrupter."

Now the second talker interrupts at time mark 6 and keeps talking. His audio is sent with 200 ms delay, but slowed down by 10%. As he continues talking, the effective delay between the words he speaks, and the words heard by the far end, increases because of the slowing that is inserted. When the effective delay reaches 2 seconds (the latency required to achieve lip-sync) after 18 seconds of his speech at time mark 7, the slowing is removed and his speech returns to normal speed (the output speed is switched from 90% to 100%), but still affected by the 2-second delay that has built up.

In this configuration as shown in FIG. 6, an interaction detector may be employed to examine the incoming audio and video information, in a manner to be described below and illustrated in FIG. 10, and uses the resultant information to select one of three audio streams to be output: minimal delay, a stream slowed by 10%, or 2-second fixed delay. In operation, then, delay is normally set (while speech is not interactive) for 2 seconds so the switch selects the two-second delay. When interaction is detected, the switch is changed to select minimal delay, which is actually 0.2 second in the above example. This results in a loss of about 2 seconds of audio, but this is not very noticeable since this has occurred during an interruption anyway. Once the interaction no longer exists, the interaction detector sets the switch to the slowdown mode in the variable speed channel, e.g. slow down by 10% or 20%, where it remains until lip-sync is obtained. In the above example, it is 18 seconds at 10% slowdown or 9 second at 20% slowdown. During the slowdown time, as demonstrated earlier, the delay smoothly increases from minimal (actually 0.2 seconds) to 2 seconds. At the end of this time, the accumulated delay is again 2 seconds, so the switch selects the fixed 2-second delay.

Figure 7:
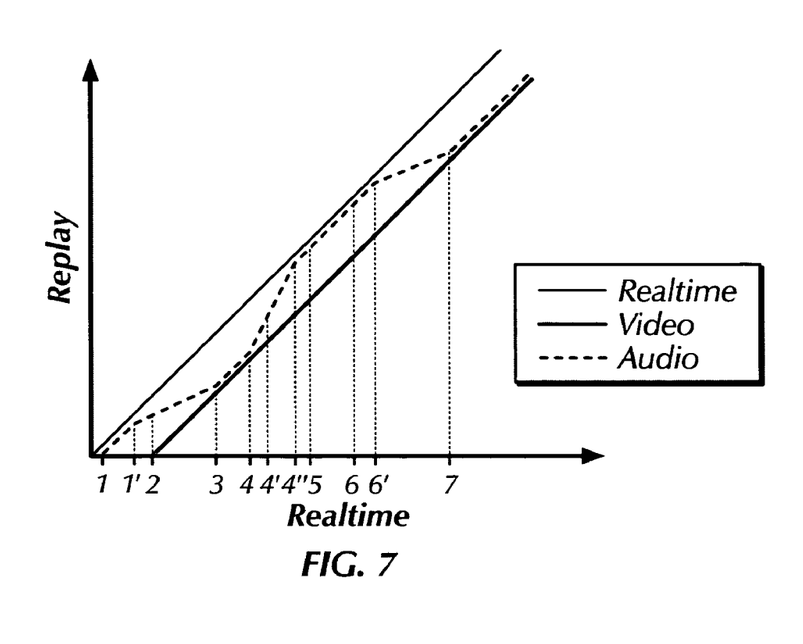
FIG. 7 illustrates the video and audio signal replay related to playing time where audio replay is slowed-down/speeded-up/normal for different conferencing conditions.
Figure 11:
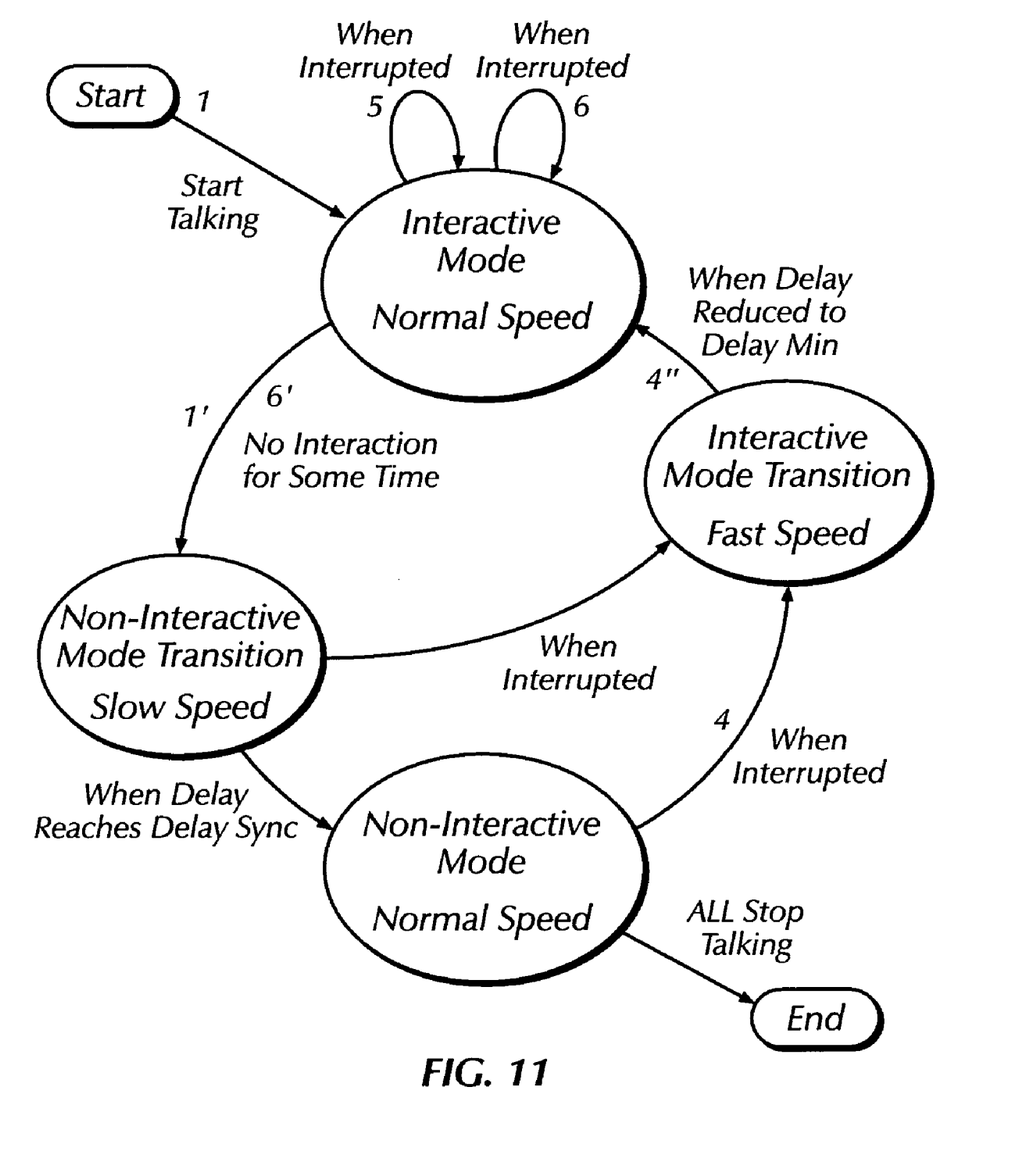
FIG. 11 is a state diagram illustrating the conferencing system operating in various modes depending on the different conferencing conditions as illustrated in FIG. 7.

In another embodiment as illustrated by FIG. 7 and FIG. 11, the same technique is refined by providing a second variable-speed channel. All time marks in FIG. 11 are the same as in FIG. 7. Here, interaction is dealt with by speeding the channel up by 20% until the 2-second delay is eliminated, rather than by immediately switching to a zero-delay, as in the previous example. In this way, the 2 seconds of speech that was lost previously is preserved, but played very quickly. Using the same scenario as used in FIG. 6, at time mark 4 the second speaker interrupts. Rather than stop the first speaker immediately and discard the last two seconds of his speech, in this embodiment, the replay of the first speaker's speech continues until it is finished at time mark 4', but at a faster speed, e.g. 120% of normal speed. The second speaker's speech is buffered, and replayed after the first speaker's speech finishes at time mark 4'. The second speaker's speech is also replayed at a higher speed, e.g. 120% of normal speed, until the audio delay reaches the minimum delay at 4". The first speaker interrupts at time mark 5. The second speaker's speech is stopped and the first speaker's speech is replayed with minimum delay. Since the second speaker's speech is replayed with minimum delay, there is minimal amount of his speech waiting in the buffer for replay and virtually nothing is lost during the switch between the second speaker to the first speaker. Similarly, when the second speaker interrupts at time mark 6, the switch over to the second speaker's speech is almost immediately with minimal delay and minimal loss of first speaker's speech. This is a more elegant approach, and results in a less perceptible action of the variable delay. After the additional audio delay is eliminated, audio may be replayed at normal speed. In this embodiment, virtually no audio is lost. The transition from monologue mode to interactive mode is gradual. To switch from interactive mode to monologue mode, the replay speed is initially slowed down, as shown at time mark 6' in FIG. 7. Once the audio delay reaches the DelaySync, the replay speed is switched back to normal to maintain the lip-sync. Once in either monologue or interactive mode, the audio is replayed at normal speed. FIG. 11 illustrates the mode changes of the audio replay modes for the embodiment illustrated in FIG. 7. There are four modes in this embodiments: an interactive mode where the audio delay is minimal and replay speed is normal; a non-interactive mode (monologue) mode where the audio delay is equal to DelaySync and the replay speed is normal; a first transition mode from interactive mode to non-interactive mode, where the audio delay is increasing and the replay speed is slowed-down; a second transition mode from non-interactive mode to interactive mode, where the audio delay is decreasing and the replay speed is speeded-up. The first and the second transition modes are transient modes during which the audio delay is increased (decreased) from DelayMin (DelaySync) to DelaySync (DelayMin). They are not steady state modes. Only the interactive mode and the non-interactive mode are steady state modes.

In the next configuration, it is recognized that a single channel with controllable playing speed can be made to embed the delay. Consequently, no switch is needed. If it begins with one second delay, then is commanded to accelerate its playing rate 20%, the delay will decrease to zero in 5 seconds. If it is then commanded to play at 100%, the delay will remain at zero. If it is commanded to play at 90%, the delay will increase. Thus, no separate channels are needed.

It will be recognized that these are all variants on the same invention, and that many other variations and means of achieving the function of the invention are possible Interactivity Detector As discussed above, an interactivity detector may be employed to assist the transition between different modes. The interactivity detector is to detect when audio has become more interactive, and to use this information to signal or control functions. This may be conveniently done by monitoring incoming audio. The most common means of performing this function is called a "Voice Activity Detector", or "VAD", which is commonly used in telephone and speech processing systems. A VAD works as follows. When the amplitude of an audio first rises above some threshold, as in the initiation of speech, "interactivity" can be deduced. When it has remained above that threshold without another participant having similarly exceeded such a threshold, it can be concluded that the speech is no longer "interactive" but has become one-sided or monologue.

Figure 8:
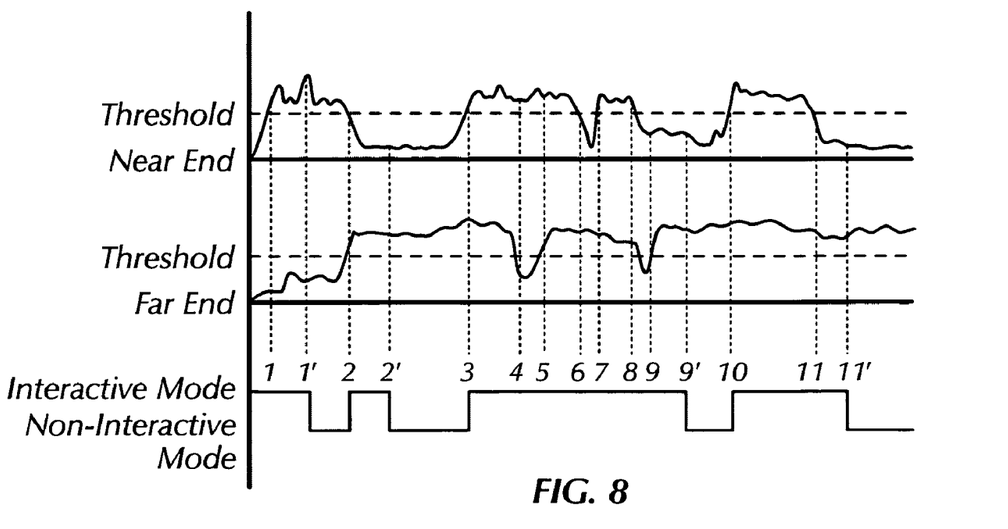
FIG. 8 illustrates the interaction of two audio channels and the Interaction Detector changing the audio replay between a monologue mode and an interactive mode.

FIG. 8 illustrates an interactivity detector at the near side of a videoconference, indicating various modes based on the audio signal at the far end. The interactivity indicator indicates interactive mode under the following conditions: 1) whenever an audio signal (the near end or the far end) exceeds a threshold and within a predetermined time period thereafter; 2) whenever both the near end signal and the far end signal exceed the threshold; 3) when condition 2 ends but within a predetermined time period. When the above three conditions are not satisfied, the interactivity indicator indicates non-interactive mode. As shown in FIG. 8, the time period between time marks 1–1', 2–2', and 9–9' satisfies condition 1); 3–4, 5–6, 7–8, 10–11 satisfies condition 2); and 4–5, 6–7, 8–9 satisfies condition 3). During the above time periods, the conference is in an interactive mode. The time periods between 1'–2, 2'–3, 9'–10 and 11' on do not satisfy any of the three conditions, and therefore are non-interactive.

Figure 9:
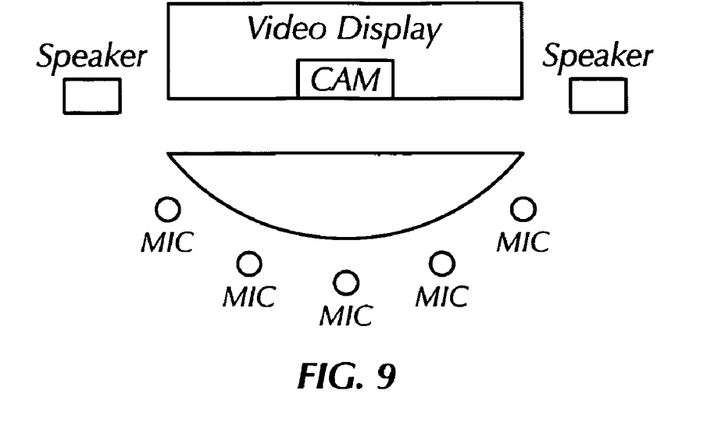
FIG. 9 illustrates a typical conferencing arrangement between camera, video display, microphones and speakers.

The interactive detector may also use other criteria or method to detect the different modes during a video conference for various types of video conferences. The following lists a few examples of the various possible methods. These are for illustration purposes and are in no way limiting the scope of the current invention to these examples.

a. Delay declaration of "interaction" for a short period of time, for example 100 ms, in order to not accidentally interpret noise or a sound impulse such as a dropped pencil as interaction.

b. Dynamically adjust the threshold at which interaction is detected based on independent measurements of speech level and room background noise level.

c. Emphasize the frequency bands in which speech mostly lies in measuring the amplitude of the signal, for example use 500 Hz to 1 KHz mid-range frequency band.

d. Apply echo cancellation, suppression, and other common speakerphone techniques to prevent falsely triggering the "interaction" decision by audio originating from the far end of the conference.

e. Make multiple measurements of energy in multiple frequency bands, and base the determination of "interactivity" on a combination rather than just one.

f. Determine interactivity based on only near-end activity. For example, interactivity may be determined if near-end amplitude has exceeded threshold for at least 4 seconds of the last five, on the deduction that the far end must not be talking if the near end is talking so much.

g. Determine interactivity based on both near-end and far-end activity. For example, interactivity may be determined if near-end amplitude has exceeded threshold for 100 ms after it has not for at least 5 seconds, unless far-end interactivity has been detected within the past 5 seconds.

h. Determination may be based on the relationship between such measurements made on two or more microphones at one site. These measurements may be made on the microphones individually, or as a group. In this example, in a typical video conference set up as shown in FIG. 9, several microphones are placed in the conference room. When the amplitudes of audio signals at several microphones exceed a threshold during any predetermined period of time, then the conference participants are interacting with each other, so the mode is interactive. If only one of the amplitudes of the audio signals from the microphones exceed the threshold during the last predetermined period of time, then only one participant is speaking, so the mode may be switched to monologue.

i. Make determination also incorporating control or descriptive information from another site, as opposed to receiving the audio from the other site and making measurements directly. This might be done by having the other site measure the amplitude of its audio, and sending this measurement data in addition to, or instead of, the audio data.

While illustrative embodiments of the invention have been illustrated and described, it will be appreciated that various changes can be made therein without departing from the spirit and scope of the invention.

Titles and subtitles used in the text are intended only as focal points and an organization tool. These titles are not intended to specifically describe the applicable discussion or imply any limitation of that discussion.

The invention claimed is:

1. A method for adjusting video and audio synchronization in a video conference with a near end and at least one far end, the method comprising the steps of:
   an interactivity detector indicating a mode of conference;
   wherein an interactive mode of conference is detected when an amplitude of an audio signal from the far end exceeds a first threshold, and
   wherein a non-interactive mode of conference is detected when the amplitude of the audio signal remains above the first threshold for a period of time;
   replaying the audio with a minimum delay if the mode of conference is interactive;
   buffering the audio in a buffer and replaying the audio with a sync delay if the mode of conference is not interactive;
   measuring a background noise level at the far end; and
   adjusting the first threshold based on the background noise level.

2. The method in claim 1, further comprising:
   replaying the audio with a varied delay if the conference is in a transition mode, wherein the conference is switching between non-interactive mode and interactive mode, and within a transition time period.

3. The method in claim 2,
   wherein when the transition mode is from non-interactive mode to interactive mode, replaying the audio upon reception with the minimum delay and discarding any audio in the buffer; and
   wherein the transition time period is substantially zero seconds.

4. The method in claim 2,
   wherein when the transition mode is from interactive mode to non-interactive mode, buffering without replaying audio received until the audio delay is equal to the sync delay; and
   wherein the transition time period is the time period from the beginning of the transition mode until the audio delay is equal to the sync delay.

5. The method in claim 2,
   wherein when the transition mode is from interactive mode to non-interactive mode, replaying audio at a slower speed until the audio delay is equal to the sync delay;
   wherein the transition time period is the time period from the beginning of the transition mode until the audio delay is equal to the sync delay; and
   wherein the replaying speed is slowed digitally without changing the audio pitch.

6. The method in claim 5,
   wherein the replaying audio speed is 80% of normal speed.

7. The method in claim 2,
wherein when the transition mode is from non-interactive mode to interactive mode, replaying audio at a faster speed until the audio delay is equal to the minimum delay;
wherein the transition time period is the time period from the beginning of the transition mode until the audio delay is equal to the minimum delay; and
wherein the replaying speed is quickened digitally without changing the audio pitch.

8. The method in claim 7,
wherein the replaying audio speed is 120% of normal speed.

9. The method in claim 7,
wherein the conference is within interactive mode and after the transition mode, the audio replay speed is switched to the normal speed.

10. The method in claim 7,
wherein the conference is within interactive mode and after the transition mode, the audio replay speed is switched to a speed slower than the normal speed.

11. The method in claim 1,
wherein when the amplitude of the audio signal from the far end drops from above the first threshold to below a second threshold, the interactivity detector indicates interactive mode; and when the amplitude remains below the second threshold for a second period of time, the interactivity detector indicates non-interactive mode.

12. The method in claim 11,
wherein when the interactivity detector delays the indication of interactive mode by a third period of time.

13. The method in claim 12 wherein the third period of tune is 0.1 second.

14. The method in claim 11,
wherein during a fourth period of time at the beginning of each interactive mode, the interactivity detector indicates the transition mode.

15. The method in claim 1,
wherein when the amplitude of the audio signal within a first frequency band from the far end increases and exceeds a third threshold, the interactivity detector indicates interactive mode; and when the amplitude remains above the third threshold for a first period of time, the interactivity detector indicates non-interactive mode; and
wherein when the amplitude of the audio signal within a first frequency band from the far end drops from above the third threshold to below a fourth threshold, the interactivity detector indicates interactive mode; and when the amplitude remains below the fourth threshold for a second period of time, the interactivity detector indicates non-interactive mode.

16. The method in claim 1,
wherein when the amplitude of the audio signal from the near end increases and exceeds a first threshold, the interactivity detector indicates interactive mode; and when the amplitude remains above the first threshold for a first period of time, the interactivity detector indicates non-interactive mode; and
wherein when the amplitude of the audio signal from the near end drops from above the first threshold to below a second threshold, the interactivity detector indicates interactive mode; and when the amplitude remains below the second threshold for a second period of time, the interactivity detector indicates non-interactive mode.

17. The method in claim 1,
wherein when the interactivity detector receives a control signal indicating change of interactivity from the far end, the interactivity detector indicates interactive mode; and after the control signal remains the same for a first period of time, the interactivity detector indicates non-interactive mode.

18. The method in claim 1,
wherein when the interactivity detector receives control signals from microphones at near end and far end and the control signals change within a fifth period of time, interactivity detector indicates interactive mode; and when the control signals remain the same for a first period of time, the interactivity detector indicates non-interactive mode.

19. The method in claim 18,
wherein when the interactivity detector delays the indication of interactive mode by a third period of time.

20. A method for adjusting video and audio synchronization in a video conference with a near end and at least one far end, the method comprising the acts of:
an interactivity detector indicating a mode of conference;
wherein when an amplitude of an audio signal from the far end increases and exceeds a first threshold, the interactivity detector indicates interactive mode; and when the amplitude remains above the first threshold for a first period of time, the interactivity detector indicates non-interactive mode; and
wherein when the amplitude of the audio signal from the far end drops from above the first threshold to below a second threshold, the interactivity detector indicates interactive mode; and when the amplitude remains below the second threshold for a second period of time, the interactivity detector indicates non-interactive mode.
replaying the audio with a minimum delay if the mode of the conference is interactive;
buffering the audio in a buffer and replaying the audio with a sync delay if the mode of conference is not interactive;
measuring a background noise level at the far end; and
adjusting the first threshold and the second threshold based on the background noise level.

21. A device at a near end for video conferencing with a video conference device at a far end, the device at the near end comprising:
a network interface for coupling with the conference device at the far end;
a controller unit coupled to the network, the audio speaker and the video display for controlling audio and video replay through the speaker and the video display;
a buffer for storing audio, video and control data;
wherein the controller unit is operative to replay the video with a sync delay;
wherein the controller unit is operative to replay the audio with a minimum delay if the mode of the conference is interactive; and
wherein the controller unit is operative to receive the audio from far end, store the audio in the buffer and replay the audio with the sync delay if the mode of conference is non-interactive.

22. The device in claim 21,
wherein the controller is operative to replay the audio with a varied delay if the conference is in a transition mode, wherein the conference is switching between non-interactive mode and interactive mode, and within a transition time period.

23. The device in claim 22,
wherein when the transition mode is from non-interactive mode to interactive mode, the controller is operative to replay the audio upon reception with the minimum delay and discarding any audio in the buffer that has not been replayed; and
wherein the transition time period is substantially zero second.

24. The device in claim 22,
wherein when the transition mode is from interactive mode to non-interactive mode, the controller is operative not to replay audio received until the audio delay is equal to the sync delay; and
wherein the transition time period is the time period from the beginning of the transition mode until the audio delay is equal to the sync delay.

25. The device in claim 22,
wherein when the transition mode is from interactive mode to non-interactive mode, the controller is operative to replay audio at a slower speed until the audio delay is equal to the sync delay;
wherein the transition time period is the time period from the beginning of the transition mode until the audio delay is equal to the sync delay; and
wherein the replaying speed is slowed digitally without changing the audio pitch.

26. The device in claim 25,
wherein the replaying audio speed is 90% of normal speed.

27. The device in claim 22,
wherein when the transition mode is from non-interactive mode to interactive mode, the controller is operative to replay audio at a faster speed until the audio delay is equal to the minimum delay;
wherein the transition time period is the time period from the beginning of the transition mode until the audio delay is equal to the minimum delay; and
wherein the replaying speed is quickened digitally without changing the audio pitch.

28. The device in claim 27,
wherein the replaying audio speed is 120% of normal speed.

29. The device in claim 27,
wherein the conference is within interactive mode and after the transition mode, the audio replay speed is switched to the normal speed.

30. The device in claim 27,
wherein the conference is within interactive mode and after the transition mode, the audio replay speed is switched to a speed slower than the normal speed.

31. The device in claim 21,
wherein the controller comprises an interactivity detector;
wherein the interactivity detector is operative to indicate interactive mode when the amplitude of the audio signal from the far end increases and exceeds a first threshold, and to indicate non-interactive mode when the amplitude remains above the first threshold for a first period of time; and
wherein the interactivity detector is operative to indicate interactive mode when the amplitude of the audio signal from the far end drops from above the first threshold to below a second threshold, and to indicate non-interactive mode when the amplitude remains below the second threshold for a second period of time.

32. The device in claim 31,
wherein when the interactivity detector is operative to delay the indication of interactive mode by a third period of time.

33. The device in claim 32 wherein the third period of time is 0.1 second.

34. The device in claim 31,
wherein for a fourth period of time at the beginning of each interactive mode, the interactivity detector is operative to indicate the transition mode.

35. The device in claim 21,
wherein the controller comprising an interactivity detector;
wherein the interactivity detector is operative to indicate interactive mode when the amplitude of the audio signal within a first frequency band from the far end increases and exceeds a third threshold, and to indicate non-interactive mode when the amplitude remains above the first threshold for a third period of time; and
wherein the interactivity detector is operative to indicate interactive mode when the amplitude of the audio signal within a first frequency band from the far end drops from above the first threshold to below a fourth threshold, and to indicate non-interactive mode when the amplitude remains below the fourth threshold for a second period of time.

36. The device in claim 21,
wherein the interactivity detector is operative to indicate interactive mode when the amplitude of the audio signal from the near end increases and exceeds a first threshold, and to indicate non-interactive mode when the amplitude remains above the first threshold for a first period of time; and
wherein the interactivity detector is operative to indicate interactive mode when the amplitude of the audio signal from the near end drops from above the first threshold to below a second threshold, and to indicate non-interactive mode when the amplitude remains below the second threshold for a second period of time.

37. The device in claim 21,
wherein the interactivity detector is operative to receive a control signal indicating change of interactivity from the far end and the interactivity detector to indicate the interactive mode; and after the control signal remains the same for a first period of time, the interactivity detector is operative to indicate non-interactive mode.

38. The device in claim 21,
wherein when the interactivity detector is operative to receive control signals from microphones at near end and far end and the control signals change within a fifth period of time, and interactivity detector is operative to indicate interactive mode; and when the control signals remain the same for a first period of time, the interactivity detector is operative to indicate non-interactive mode.

39. The device in claim 38,
wherein when the interactivity detector delays the indication of interactive mode by a third period of time.

40. A device at a near end for video conferencing with a video conference device at a far end, the device at the near end comprising:
a network interface for coupling with the conference device at the far end;
a controller unit coupled to the network, the audio speaker and the video display for controlling audio and video replay through the speaker and the video display;

a buffer for storing audio, video and control data;
wherein the controller unit is operative to replay the video with a sync delay;
wherein the controller unit is operative to replay the audio with a minimum delay if the mode of the conference is interactive;
wherein the controller unit is operative to receive the audio from far end, store the audio in the buffer and replay the audio with the sync delay if the mode of conference is non-interactive;
wherein the controller comprises an interactivity detector;
wherein the interactivity detector is operative to indicate interactive mode when the amplitude of the audio signal from the far end increases and exceeds a first threshold, and to indicate non-interactive mode when the amplitude remains above the first threshold for a first period of time;
wherein the interactivity detector is operative to indicate interactive mode when the amplitude of the audio signal from the far end drops from above the first threshold to below a second threshold, and to indicate non-interactive mode when the amplitude remains below the second threshold for a second period of time; and
wherein the controller is operative to derive a background noise level at the near end and transmit a control signal indicating the background noise level.

41. A video conference system having a near end and at least one far end, the system comprising:
a microphone, a video camera, a speaker and a video display at the near end;
a network interface at the near end for coupling with the conference system at the far end;
a controller unit at the near end coupled to the network, the microphone, the video camera, the audio speaker and the video display for controlling audio and video generation and replay;
a buffer at the near end for storing audio, video and control data; and
a far end system;
wherein the controller unit is operative to replay the video with a sync delay;
wherein the controller unit is operative to replay the audio with a minimum delay if the mode of the conference at near end is interactive; and
wherein the controller unit is operative to receive the audio from far end, store the audio in the buffer and replay the audio with the sync delay if the mode of conference at near end is non-interactive.

42. The system in claim 41,
wherein the controller is operative to replay the audio with a varied delay if the conference at near end is in a transition mode, wherein conference at near end is switching between non-interactive mode and interactive mode, and within a transition time period.

43. The system in claim 42,
wherein when the transition mode is from non-interactive mode to interactive mode, the controller is operative to replay the audio upon reception with the minimum delay and discarding any audio in the buffer that has not been replayed; and
wherein the transition time period is substantially zero second.

44. The system in claim 42,
wherein when the transition mode is from interactive mode to non-interactive mode, the controller is operative not to replay audio received until the audio delay is equal to the sync delay; and
wherein the transition time period is the time period from the beginning of the transition mode until the audio delay is equal to the sync delay.

45. The system in claim 42,
wherein when the transition mode is from interactive mode to non-interactive mode, the controller is operative to replay audio at a slower speed until the audio delay is equal to the sync delay;
wherein the transition time period is the time period from the beginning of the transition mode until the audio delay is equal to the sync delay; and
wherein the replaying speed is slowed digitally without changing the audio pitch.

46. The system in claim 42,
wherein when the transition mode is from non-interactive mode to interactive mode, the controller is operative to replay audio at a faster speed until the audio delay is equal to the minimum delay;
wherein the transition time period is the time period from the beginning of the transition mode until the audio delay is equal to the minimum delay; and
wherein the replaying speed is quickened digitally without changing the audio pitch.

47. The system in claim 46,
wherein the conference at the near end is within interactive mode and after the transition mode, the audio replay speed is switched to the normal speed.

48. The system in claim 46,
wherein the conference at the near end is within interactive mode and after the transition mode, the audio replay speed is switched to a speed slower than the normal speed.

49. The system in claim 41,
wherein the controller at the near end comprising an interactivity detector;
wherein the interactivity detector is operative to indicate interactive mode when the amplitude of the audio signal from the far end increases and exceeds a first threshold, and to indicate non-interactive mode when the amplitude remains above the first threshold for a first period of time; and
wherein the interactivity detector is operative to indicate interactive mode when the amplitude of the audio signal from the far end drops from above the first threshold to below a second threshold, and to indicate non-interactive mode when the amplitude remains below the second threshold for a second period of time.

50. The system in claim 49,
wherein when the interactivity detector delays the indication of interactive mode by a third period of time.

51. The system in claim 41, wherein the far end system comprises:
a microphone, a video camera, a speaker and a video display at a far end;
a network interface at the far end coupled to the network interface at the near end;
a controller at the far end coupled to the above far end devices including the network interface, the microphone, the video camera, the audio speaker and the video display, for controlling audio and video generation and replay at the far end;
a buffer at the far end for storing audio, video and control data;
wherein the controller at the far end is operative to replay the video with a sync delay;

wherein the controller at the far end is operative to replay the audio with a minimum delay if the mode of the conference at the far end is interactive; and wherein the controller at the far end is operative to receive the audio from the near end, store the audio in the buffer and replay the audio with the sync delay if the mode of conference at the far end is non-interactive.

52. The system in claim 51, wherein the controller at the far end is operative to replay the audio with a varied delay if the conference at the far end is in a transition mode, wherein the conference at the far end is switching between a non-interactive mode and an interactive mode, and within a far end transition time period.

53. The system in claim 52, wherein when the transition mode is from non-interactive mode to interactive mode, the controller at far end is operative to replay the audio upon reception with the minimum delay and discarding any audio in the buffer that has not been replayed; and wherein the far end transition time period is substantially zero second.

54. The system in claim 52, wherein when the transition mode is from interactive mode to non-interactive mode, the controller at the far end is operative not to replay audio received until the audio delay is equal to the sync delay; and wherein the far end transition time period is the time period from the beginning of the transition mode until the audio delay is equal to the sync delay.

55. The system in claim 52, wherein when the transition mode is from interactive mode to non-interactive mode, the controller at the far end is operative to replay audio at a slower speed until the audio delay is equal to the sync delay;

wherein the far end transition time period is the time period from the beginning of the transition mode until the audio delay is equal to the sync delay; and wherein the replaying speed is slowed digitally without changing the audio pitch.

56. The system in claim 52, wherein when the transition mode is from non-interactive mode to interactive mode, the controller at the far end is operative to replay audio at a faster speed until the audio delay is equal to the minimum delay;

wherein the far end transition time period is the time period from the beginning of the transition mode until the audio delay is equal to the minimum delay; and wherein the replaying speed is quickened digitally without changing the audio pitch.

57. The system in claim 56, wherein the conference at the far end is within interactive mode and after the transition mode, the audio replay speed is switched to the normal speed.

58. The system in claim 56, wherein the conference at the far end is within interactive mode and after the transition mode, the audio replay speed is switched to a speed slower than the normal speed.

59. The system in claim 41, wherein the controller unit is operative to derive a background noise level at the near end and transmit a control signal indicating the background noise level.

60. A method for controlling synchronization of video and audio in a video conference between a near end and at least one far end, the method comprising the acts of:

detecting a conference mode, wherein an interactive mode is detected when an amplitude of an audio signal from the far end exceeds a threshold, and wherein a non-interactive mode is detected when the amplitude of the audio signal remains above the threshold for a period of time;

replaying the audio with a minimum delay if the mode is interactive;

buffering the audio in a buffer and replaying the audio with a sync delay if the mode is not interactive;

measuring a speech level at the far end; and adjusting the threshold based on the speech level.

* * * * *